US008960689B1

(12) United States Patent
Williams

(10) Patent No.: US 8,960,689 B1
(45) Date of Patent: Feb. 24, 2015

(54) HIGH MISALIGNMENT WHEEL DRIVE

(71) Applicant: Mark Williams Enterprises, Inc., Louisville, CO (US)

(72) Inventor: Mark Williams, Louisville, CO (US)

(*) Notice: Subject to any disclaimer, the term of this patent is extended or adjusted under 35 U.S.C. 154(b) by 0 days.

(21) Appl. No.: 14/258,502

(22) Filed: Apr. 22, 2014

Related U.S. Application Data

(60) Provisional application No. 61/814,607, filed on Apr. 22, 2013.

(51) Int. Cl.
*F16D 3/18* (2006.01)
*B62D 17/00* (2006.01)

(52) U.S. Cl.
CPC ............... *F16D 3/185* (2013.01); *B62D 17/00* (2013.01); *B60G 2200/46* (2013.01)
USPC ........................................ 280/5.521; 464/159

(58) Field of Classification Search
CPC .... F16D 3/185; B60G 2200/46; B62D 17/00; B60B 37/00; Y10S 180/906
USPC ........................ 280/5.52, 5.521; 464/158, 159
See application file for complete search history.

(56) References Cited

U.S. PATENT DOCUMENTS

| 1,841,418 | A | * | 1/1932 | Scott | 464/150 |
| 1,937,821 | A | * | 12/1933 | Jarrett | 180/256 |
| 4,275,799 | A | * | 6/1981 | Guimbretiere | 180/255 |
| 4,824,418 | A | * | 4/1989 | Taubert | 464/159 |
| 4,953,889 | A | * | 9/1990 | Reilly | 280/86.754 |
| 5,197,786 | A | * | 3/1993 | Eschenburg | 301/124.1 |
| 2005/0262955 | A1 | * | 12/2005 | Rankin | 74/325 |
| 2010/0069166 | A1 | * | 3/2010 | Gleasman et al. | 464/159 |
| 2012/0306173 | A1 | * | 12/2012 | Meitinger et al. | 280/86.751 |

OTHER PUBLICATIONS

Drawings of various prior art hub/axle assemblies, known to be prior art prior to Apr. 22, 2013.

* cited by examiner

*Primary Examiner* — Drew Brown

(57) ABSTRACT

A high misalignment wheel drive includes a spline drive with external crown spline for rotation around an axis of the axle shaft and a drive plate for rotation about a drive plate axis, the drive plate including an internal spline for engaging the external crown spline in a pivotable splined connection to allow the spline drive to rotationally drive the drive plate while the drive plate axis is non-aligned with respect to the axle axis by up to an angle α. First and second thrust faces are positioned with respect to the spline drive to rotate with the spline drive and define the angle α between which third and fourth thrust faces, positioned with respect to the drive plate to rotate with the drive plate and for engaging the first and second thrust faces respectively, can move.

16 Claims, 6 Drawing Sheets

US 8,960,689 B1

HIGH MISALIGNMENT WHEEL DRIVE

This application claims priority to U.S. provisional patent application 61/814,607 by the present inventor entitled High Misalignment Wheel Drive and filed Apr. 22, 2013, the entirety of which, including the Appendix thereto, is incorporated by reference herein.

FIELD OF THE INVENTION

The present invention relates to an automotive axle assembly, and particularly to a rear axle assembly for a rear drive racing automobile.

BACKGROUND OF THE INVENTION

A dependent rear axle assembly is an automotive type differential where both rear wheels are solidly connected to a housing to move up and down with the housing. In an independent or semi-independent type of rear suspension, the rear wheels can move up and down with respect to the differential housing. A floating hub is an axle housing hub to which the wheel is attached that directs the resulting force from vehicle weight and cornering forces to the axle housing. A flange type axle assembly attaches the wheel directly to the axle flange, which can result in wheel separation in the event of axle shaft failure.

In a typical rear wheel drive automobile having a dependent rear suspension, the axle assembly is mounted to be generally parallel to the ground and the wheels and wheels hubs are mounted perpendicularly to an axis of the axle assembly, with the wheels rotating about the same axis as the axle shaft.

BRIEF SUMMARY OF THE INVENTION

The present invention is a drive assembly for use with an axle assembly that allows effective and durable power transmission between a driven axle shaft and a wheel hub which rotates about a different axis than an axis of rotation of the axle shaft, or in other words, the wheel hub is oriented at other than 90° with respect to the axle shaft.

In one embodiment, a high misalignment wheel drive, includes: a spline drive combinable with an axle shaft for rotation around an axis of the axle shaft, the spline drive including an external crown spline; a drive plate for rotation about a drive plate axis, the drive plate including an internal spline for engaging the external crown spline in a pivotable splined connection to allow the spline drive to rotationally drive the drive plate while the drive plate axis is non-aligned with respect to the axle axis by up to an angle α, the drive plate including a mounting arrangement for mounting to a driven wheel. A first thrust face is positioned with respect to the spline drive to rotate with the spline drive. A second thrust face is positioned with respect to the first thrust face to rotate with the spline drive. A third thrust face is positioned with respect to the drive plate to rotate with the drive plate for engaging the first thrust face. A fourth thrust face is positioned with respect to the drive plate to rotate with the drive plate for engaging the second thrust face. The first thrust face and second thrust face define an angle of movement between which at least one chosen from the third thrust face and the fourth thrust face can pivot with respect to the spline drive between a position where the third thrust face engages the first thrust face, and a position where the fourth thrust face engages the first thrust face.

BRIEF DESCRIPTION OF THE DRAWINGS

Further objects and advantages of this invention will become more apparent and more readily appreciated from the following detailed description of the present invention, taken in conjunction with the accompanying drawings, of which.

DETAILED DESCRIPTION OF THE INVENTION

Figure 1:
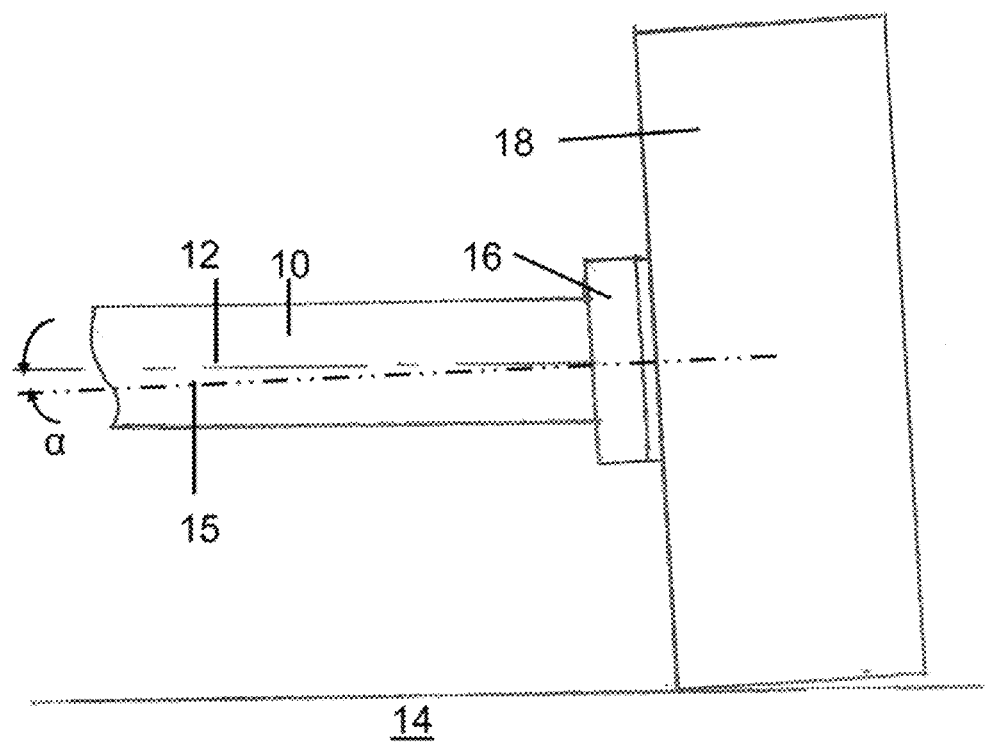
FIG. 1 shows a rear elevational view of a dependent suspension axle.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In certain types of automotive racing which use a dependent rear axle housing suspension for rear wheel drive, attempts are being made to mount the wheels and wheels hubs at other than a perpendicular angle with respect to the axle housing to improve traction. That is, the wheels and wheel hubs can be mounted at a camber with respect to the axle assembly. In instances where the cars turn both left and right on the track, both left and right wheels can be given a camber, usually negative, with respect to the axle to improve traction. As is seen in FIG. 1, a dependent suspension axle 10 has an axis 12 which is oriented generally parallel with the ground (track) 14. The axle 10 is shown here as a floater type axle but can be other types as well. However, hub mount 16 and wheel/tire 18 are not oriented perpendicular to the axis 12 but rotate about an axis 15 which is at an angle α with respect to axis 12. The wheel 18 has a negative camber with respect to the axle 10. Although the dependent suspension axle 10 can be mounted at the rear of the auto in a rear wheel drive orientation, the axle 10 can also be mounted at a front of the auto in a front wheel drive or four/all wheel drive situation. The angle α can be any desired angle but is typically a few degrees, with one preferred embodiment being approximately 3.5°, although α can be larger or smaller than this angle. Although there is a gap shown between the tire 18 and the ground 14, this is shown just for clarity of explanation. The flexibility of the tire will conform the tire to the ground and remove the gap.

In other instances, such as stock car racing on oval tracks where the cars always turn in the same direction, tires of different circumferences (diameter) can be used on the rear driven axle to compensate for the corner turning radiuses that require the tire on the larger (outside) radius to travel a greater distance than the tire on the smaller (inside) radius. In this situation, the axle housing can actually be angled with respect to the track surface, so that axis 15 is parallel to the track surface 14, while axis 12 is at the angle α with respect to the track surface 14. To realign the orientation of the tire with respect to the track surface 14, the larger diameter tire is given positive camber with respect to the axle housing while the smaller diameter tire is given negative camber with respect to the axle housing. In this manner, even though the axle housing is angled with respect to the track surface because of the different diameter tires, the tires can maintain a flat orientation to the track surface. In such situation, the positive camber given to the larger tire can be equal in magnitude to the negative camber given to the smaller diameter tire, although such is not required and may be different in some cases.

In a further aspect, the positive/negative camber situation discussed in the paragraph above can be combined with some element of camber as discussed in the paragraph preceding the paragraph immediately above, to improve traction of the tires.

The different tire diameters and/or the angle α can be changed for desired/improved performance depending on the car, track, length of track, banking of track, other track conditions and other factors.

The present invention can be used in any of these instances, where the wheel rotates about a different axis than the axis of rotation of the axle shaft, and with any type of axle assembly, including flange, floater and live, as depicted in the Appendix, as well as other types of axle assemblies.

Figure 2:
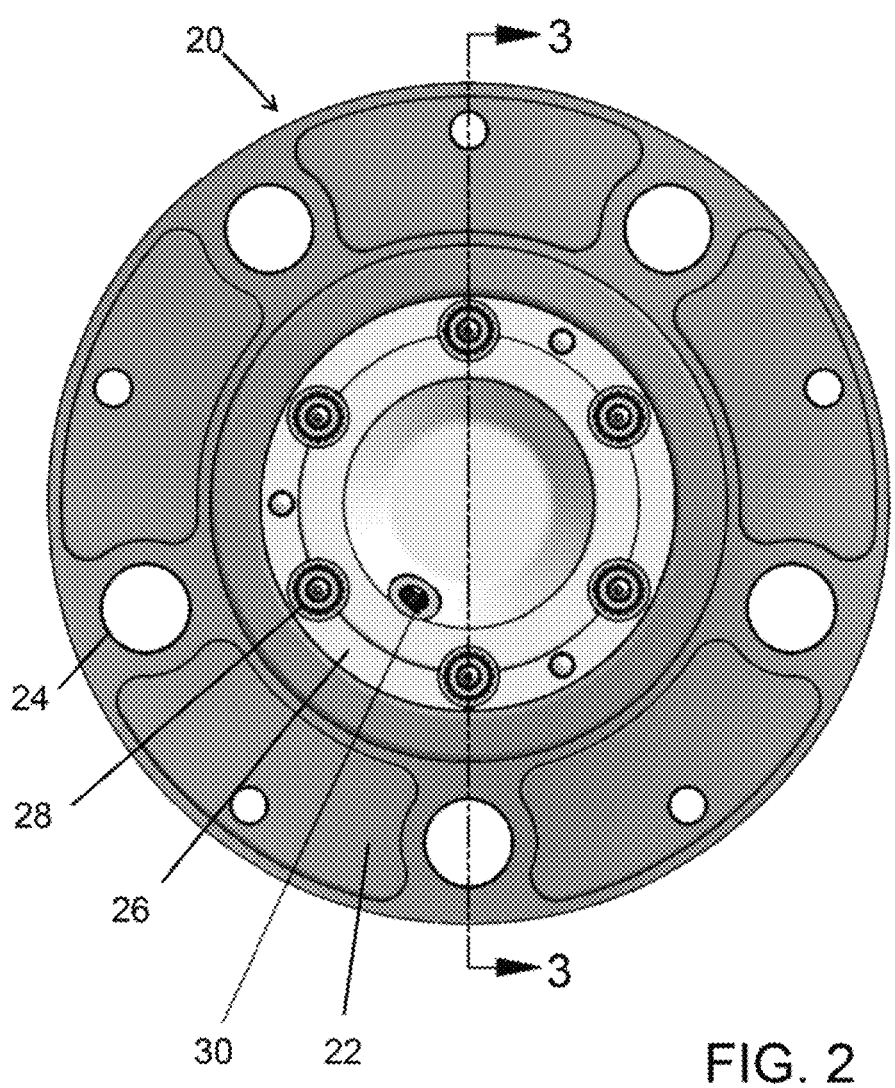
FIG. 2 shows an end elevational view of an embodiment of the drive assembly of the present invention.

FIG. 2 shows an end view of an embodiment of the drive assembly 20 of the present invention. Drive assembly 20 includes drive plate 22 having a plurality of mounting bores 24. Drive plate 22 can be mounted to a floater hub of the type shown in the Appendix. In such a case, the floater spindle is oriented such that its axis 15 is at the angle α with respect to the axle axis 12, with the floater hub rotating on the floater spindle about the spindle axis 15.

A cap 26 is mounted to drive plate 22 with a plurality of screws 28 and with oil seal 30 maintains a liquid tight lubricant reservoir 32 in an interior of the drive plate 22. See FIGS. 3-4. A threaded plug 34 is provided in the cap 26 for filling and checking lubricant. Screws 38 are sealed with O-rings 29. An inner seal 50 is positioned on an inner side of the drive plate 22 and retained by a retaining ring 52 to seal the lubricant reservoir 32 on the inner side of the drive plate 22. The inner seal can engage a spline drive 40, the axle shaft 36 or another component to maintain the seal. The lubricant reservoir allows the use of oil instead of grease, which provides superior lubrication for the drive assembly and particularly the spline drive discussed below.

Figure 3:
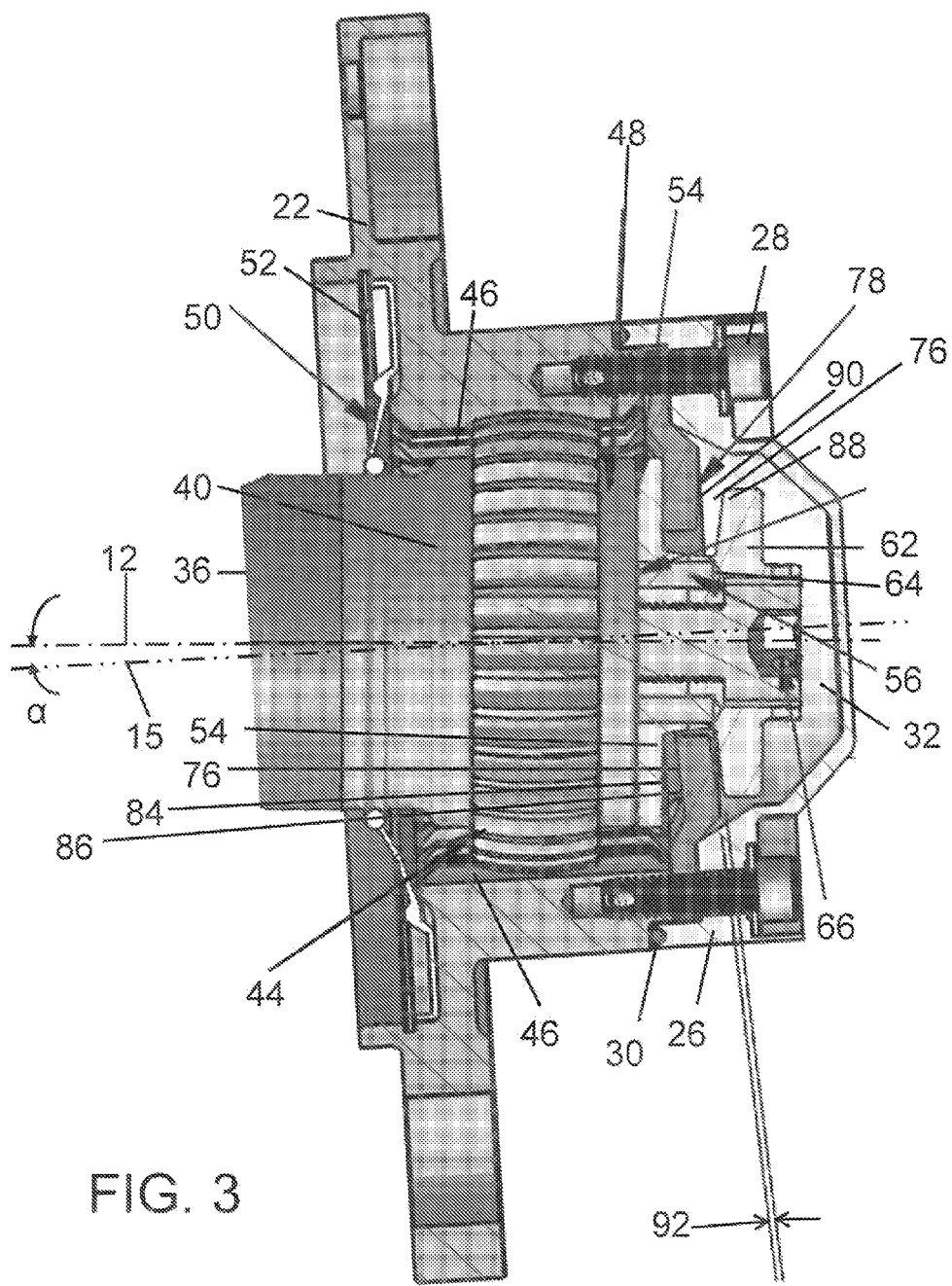
FIG. 3 shows a sectional view of the drive assembly of FIG. 2 taken along section line 3-3.

FIG. 3 shows a sectional view of the drive assembly of FIG. 2 taken along section line 3-3. An axle shaft 36 is rotationally mounted in the axle 10 to rotate about axis 12. The axle shaft 36 includes a splined end 38 to receive a spline drive 40. The spline drive 40 has an internal spline 42 for mating with the splined end 38 and an external crown spline 44 to mate with an internal spline 46 of drive plate 22. Because the axle shaft 36 rotates about axis 12 but the drive plate 22 rotates about an axis 15 being at the angle α with respect to the axis 12, accommodation must be made for this between the spline drive 40 and the internal spline 46. To accommodate this, the external crown spline 44 is convexly radiused. In this manner, as the drive plate 22 rotates with the axle shaft 22 but about different axes, a continuous sliding motion is allowed between the spline connection of external crown spline 44 and internal spline 45 because of the radius of external crown spline 44. As can be seen in FIG. 3, the connection between the external crown spline 44 and the internal spline 46 is positioned axially inwardly with respect to the drive plate 22 at the bottom of FIG. 3 than at the top of FIG. 3. As the bottom portion of the drive plate 22 rotates around to the top, the engagement between the external crown spline 44 and the internal spline 46 will be sliding axially outwardly with respect to the drive plate 22 until it reaches the outward position shown at the top of FIG. 3. Retaining ring 48 engages axle shaft 36 to retain the spline drive 40 on the axle shaft 36 and keeps the assembly connected as one unit. The spline drive 40 is replaceable upon shearing the retaining ring 48 to allow replacement of the spline drive without requiring replacement of the axle shaft 36. In one embodiment, the retaining ring 48 is aluminum and is positioned internally of the spline drive 40 and the spline drive can be removed by shearing the aluminum retaining ring with a press. Different shear strength materials can be used in the retaining ring 48 to change the strength of the attachment.

An inner thrust button 54 is rotationally fixed on the end of axle shaft 36 by retaining pins 56 engaging bores 58 in the axle shaft and bores 60 in the inner thrust button 54. An outer thrust button 62 has bores 64 for also receiving the retaining pins 56 to be rotationally fixed to the axle shaft 36. A retaining bolt 66 passes through center bore 68 in the outer thrust button 62 and center bore 70 in inner thrust button 54 to engage threaded bore 72 in axle shaft 36 to axially retain the thrust buttons on the axle shaft 36. One or both of the thrust buttons includes an axially extending flanged surface 74 that creates a gap 76 between the thrust buttons.

A thrust plate 78 is adapted to be positioned in the gap 76 when the thrust buttons are being mounted to the axle shaft 36 by retaining bolt 66. The thrust plate 78 has a plurality of outer bores 82 for engaging the screws 28 to rotationally fix the thrust plate 78 with respect to the drive plate 22, although another mechanism could be used for such fixation. The thrust plate 78 includes a center bore 80 which is sufficiently large to clear the flanged surface 74 and retaining pins 56 to allow the thrust plate to rotate with respect to the thrust buttons and axle shaft 36.

As is best seen in FIG. 3, the thrust plate 78 axially retains the axle shaft 36 while allowing the sliding movement of the spline connection (described above) as the drive plate 22 and axle shaft rotate about their different respective axes. The inner thrust button 54 has a thrust face 84 for engaging an inner thrust face 86 of thrust plate 78. Outer thrust button 62 has a thrust face 88 for engaging outer thrust face 90 of thrust plate 78 positioned on an opposite side of thrust plate 78 from inner thrust face 86. The thrust face 84 and inner thrust face 86 are configured to be generally aligned at one portion of the rotation circle where the splined engagement is outward-most on the drive plate 22 (the top in FIG. 3) while the thrust face 88 and outer thrust face 90 are configured to be generally aligned at an opposite portion of the rotation circle where the splined engagement is inward-most on the drive plate 22 (the bottom in FIG. 3). An axial clearance 92 can be provided between the dimensions of the gap 76 and the thrust faces of the thrust plate 78 as is desired to provide for clearance and thermal expansion. In one embodiment, that clearance gap 92 is approximately 0.034 inch but any desired gap can be provided. Mating angles of the thrust face pairs 84 to 86 and 88 to 90 can be set to correspond to angle α to maintain maximum thrust surface contact area. The present invention applies to any angle α or range of angles α within the range 0-90° inclusive, although angles of α will typically be within 0-10°, and more typically within 0-3.5°.

Figure 5:
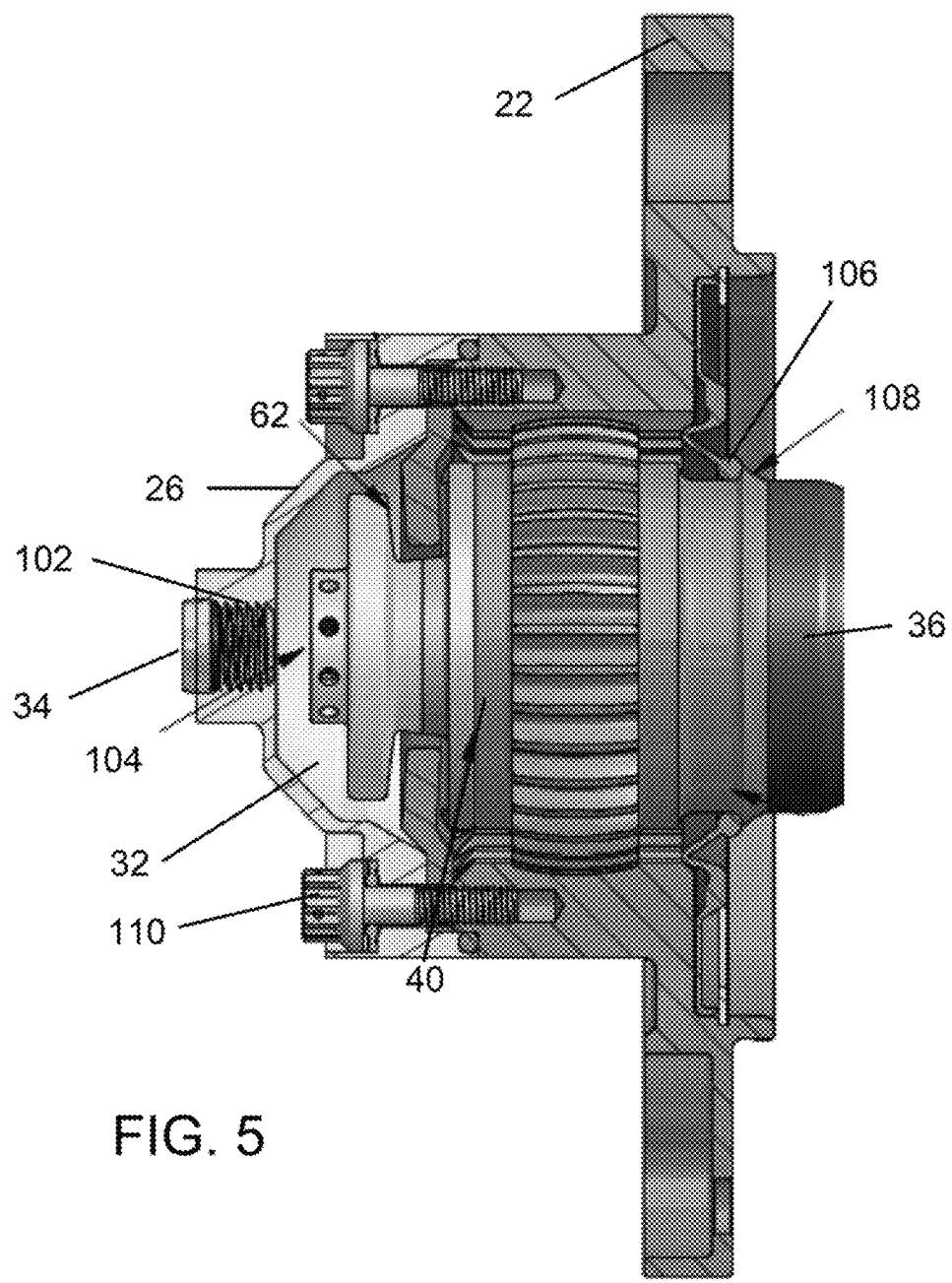
FIG. 5 shows a sectional view of an embodiment of the drive assembly of the present invention.
Figure 6:
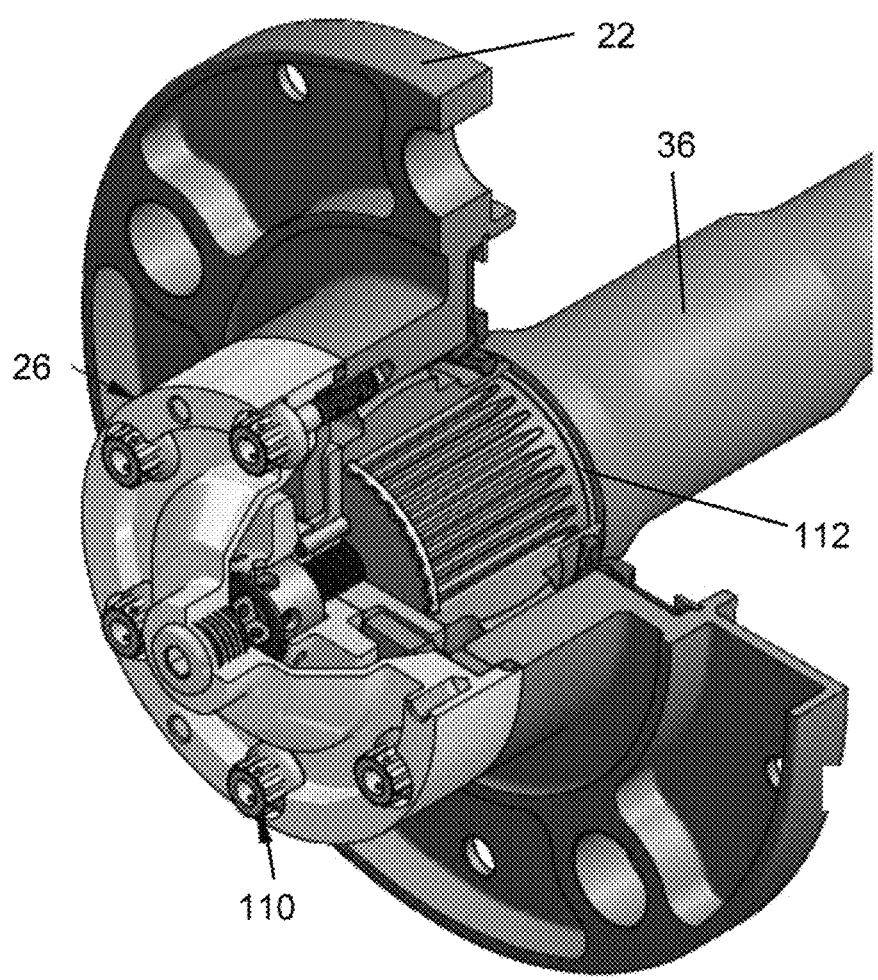
FIG. 6 shows a perspective view sectional view of the drive assembly of FIG. 5.

FIG. 5 shows an embodiment of the drive assembly. FIG. 6 shows a perspective sectional view of the embodiment of FIG. 5. Here the angle α is shown at 0°, although the angle α can be any angle discussed above.

The cap 26 includes a centrally located threaded bore 102 into which the oil fill plug 34 can be threaded. Oil fill plug 34 can be magnetized or have a magnetic insert to collect metallic debris from the lubricating oil. An inner oil seal 106 engages the spline drive 40 to maintain an oil tight seal. The oil seal 106 is structured so that it is positioned at a shallower angle to the axle shaft 36 as compared to the oil seal shown in FIG. 3. This shallower angle has been found to be beneficial in maintaining the oil sealing engagement as the drive plate 22 rotates with the axle shaft 36 but about different axes to create a wobble motion of the drive plate 22 and oil seal 106 with respect to the spline drive 40. Spline drive 40 includes an oil seal flange 108 to engage the lip of the oil seal 106. This oil seal flange 108 provides a stronger oil seal between the oil seal 106 and the spline drive 40 and has been found to be able to maintain an effective oil seal for the reservoir 32 up to approximately 18 psi in the reservoir 32 (caused by heating of the oil and air in the reservoir 32). An O-ring 112 is positioned between a flange of axle shaft 36 and spline drive 40 to prevent oil leakage through the spline joint between the axle shaft 36 and the spline drive 40.

Oil can be added to the reservoir 32 through the threaded bore 102. In one approach, the axle shaft 36 is held vertically such that the bore 102 is located bottom-most with respect to the drive assembly and oil is injected into the reservoir with an injector maintaining a seal with the bore 102. By holding open a portion of a lip of the oil seal 106, air in the reservoir 32 is allowed to escape as oil is injected into the reservoir 32 so that the reservoir 32 is entirely filled with oil. This provides the advantage that as the drive assembly heats up during use, and it can reach 250-275° or more, there is no air in the reservoir 32 to expand and force the lubricating oil out of the reservoir 32 between the oil seal 106 and the spline drive 40. Once the reservoir is filled with oil 32 and all air has been removed from the reservoir 32, the axle shaft can be inverted so that the threaded bore 102 is upward most. At this point, the oil injector can be removed, the reservoir is topped up with oil and the oil plug 34 reinstalled into the threaded bore 102.

Figure 4:
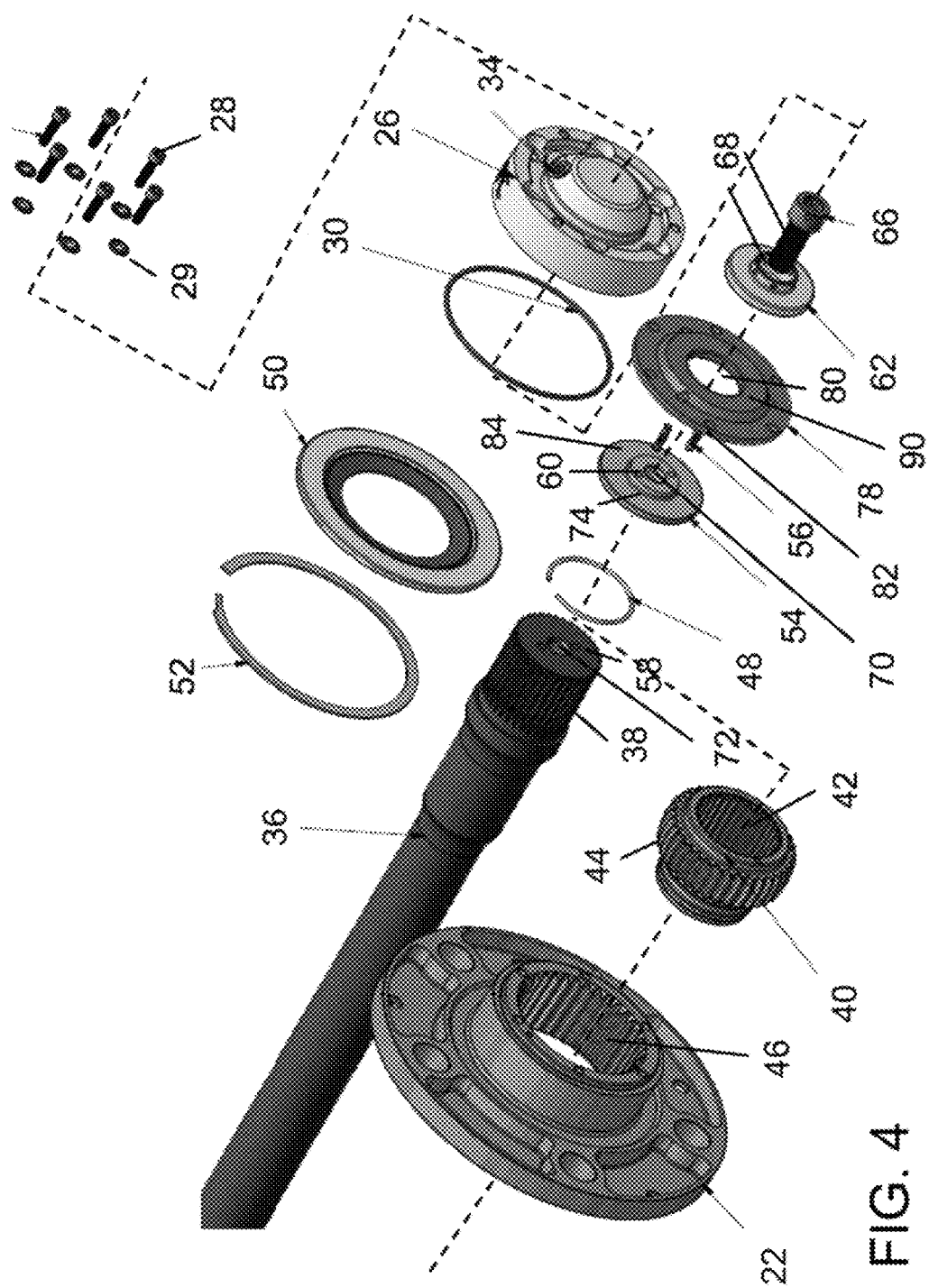
FIG. 4 is an exploded view of the drive assembly of FIG. 2.

Flange 104 of outer thrust button 62 is drilled for safety wiring the bolt 66, as is also shown in FIGS. 3-4. Screws 110 include externally splined heads and bores for receiving safety wire.

Various features of the various embodiments disclosed herein can be combined in different combinations to create new embodiments within the scope of the present invention.

REFERENCE NUMBERS 10 dependent suspension axle
12 axis
14 ground
15 axis
16 hub mount
18 wheel/tire
20 drive assembly
22 drive plate
24 mounting bores
26 cap
28 screws
29 O-rings
30 oil seal
32 reservoir
34 plug
36 axle shaft
38 splined end
40 spline drive
42 internal spline
44 external crown spline
46 internal spline
48 retaining ring
50 inner oil seal
52 retaining ring
54 inner thrust button
56 retaining pins
58 bores
60 bores
62 outer thrust button
64 bores
66 retaining bolt
68 center bore
70 center bore
72 threaded bore
74 flanged surface
76 gap
78 thrust plate
80 center bore
82 outer bore
84 thrust face of inner thrust button
86 inner thrust face of thrust plate
88 thrust face of outer thrust button
90 outer thrust face of thrust plate
92 axial clearance
102 threaded bore
104 drilled flange
106 inner oil seal
108 oil seal flange
110 screw
112 O-ring

The invention claimed is:

1. A high misalignment wheel drive, comprising:
 a spline drive combinable with an axle shaft for rotation around an axis of the axle shaft, the spline drive including an external crown spline;
 a drive plate for rotation about a drive plate axis, the drive plate including an internal spline for engaging the external crown spline in a pivotable splined connection to allow the spline drive to rotationally drive the drive plate while the drive plate axis is non-aligned with respect to the axle axis by up to an angle $\alpha$, the drive plate including a mounting arrangement for mounting to a driven wheel;
 a first thrust face positioned with respect to the spline drive to rotate with the spline drive;
 a second thrust face positioned with respect to the first thrust face to rotate with the spline drive;
 a third thrust face positioned with respect to the drive plate to rotate with the drive plate for engaging the first thrust face; and
 a fourth thrust face positioned with respect to the drive plate to rotate with the drive plate for engaging the second thrust face;
 wherein the first thrust face and second thrust face define an angle of movement between which at least one chosen from the third thrust face and the fourth thrust face can pivot with respect to the spline drive between a position where the third thrust face engages the first thrust face, and a position where the fourth thrust face engages the first thrust face.

2. The high misalignment wheel drive of claim 1, and further comprising:
 a first thrust button on which the first thrust face is positioned;
 a second thrust button on which the second thrust face is positioned;
 wherein the first and second thrust buttons are positioned with respect to each other and the spline drive, with the first and second thrust faces facing each other and defining an outwardly expanding thrust gap therebetween;
 a thrust plate connected to the drive plate to rotate with the drive plate, the thrust plate being positioned in the thrust gap with the third and fourth thrust faces positioned on opposite sides of the thrust plate such that the third thrust face faces the first thrust face and the fourth thrust face faces the second thrust face.

3. The high misalignment wheel drive of claim 2, and further comprising:
the axle shaft;
wherein the first thrust button and the second thrust button are attached to the axle shaft by a threaded fastener engaging the axle shaft.

4. The high misalignment wheel drive of claim 3, and further comprising:
a cap positioned on one side of the drive plate;
an oil seal positioned on an opposite side of the drive plate and engaging between the drive plate and a component rotating with the axle shaft;
the cap and oil seal creating an oil reservoir therebetween in which are positioned, the splined connection, the first and second thrust buttons and the thrust plate.

5. The high misalignment wheel drive of claim 4, wherein the thrust plate is clamped between the cap and the drive plate.

6. The high misalignment wheel drive of claim 5, and further comprising:
at least one retaining pin engaging the axle shaft and at least one chosen from the first thrust button and the second thrust button to rotationally fix at least one chosen from the first thrust button and the second thrust button to the axle shaft.

7. The high misalignment wheel drive of claim 6, wherein the external crown spline is convexly radiused.

8. The high misalignment wheel drive of claim 7, wherein the spline drive includes an internal spline and the axle shaft includes an external spine for mating with the internal spline of the spline drive to rotationally fix the spline drive with the axle shaft.

9. The high misalignment wheel drive of claim 8, wherein when the thrust gap includes a clearance between dimensions of the thrust gap and dimensions of the thrust plate when the high misalignment wheel drive is at ambient temperature to provide for thermal expansion.

10. The high misalignment wheel drive of claim 9, wherein $\alpha$ is in a range of 0-10° inclusive.

11. The high misalignment wheel drive of claim 10, wherein $\alpha$ is in a range of 0-4.5° inclusive.

12. The high misalignment wheel drive of claim 1, wherein the external crown spline is convexly radiused.

13. The high misalignment wheel drive of claim 3, wherein the spline drive includes an internal spline and the axle shaft includes an external spine for mating with the internal spline of the spline drive to rotationally fix the spline drive with the axle shaft.

14. The high misalignment wheel drive of claim 2, wherein when the thrust gap includes a clearance between dimensions of the thrust gap and dimensions of the thrust plate when the high misalignment wheel drive is at ambient temperature to provide for thermal expansion.

15. The high misalignment wheel drive of claim 1, wherein $\alpha$ is in a range of 0-10° inclusive.

16. The high misalignment wheel drive of claim 15, wherein $\alpha$ is in a range of 0-4.5° inclusive.

\* \* \* \* \*